(12) United States Patent
Bialon et al.

(10) Patent No.: US 11,117,560 B2
(45) Date of Patent: Sep. 14, 2021

(54) MEMBRANE VALVE ARRANGEMENT

(71) Applicant: WABCO Europe BVBA, Brussels (BE)

(72) Inventors: Rafal Bialon, Olawa (PL); Siegfried Höfler, Hannover (DE); Andreas Teichmann, Isernhagen (DE); Ingo Torhoff, Barsinghausen (DE)

(73) Assignee: WABCO Europe BVBA, Brussels (BE)

( * ) Notice: Subject to any disclaimer, the term of this patent is extended or adjusted under 35 U.S.C. 154(b) by 176 days.

(21) Appl. No.: 16/321,584

(22) PCT Filed: Jul. 17, 2017

(86) PCT No.: PCT/EP2017/000858
§ 371 (c)(1),
(2) Date: Jan. 29, 2019

(87) PCT Pub. No.: WO2018/024360
PCT Pub. Date: Feb. 8, 2018

(65) Prior Publication Data
US 2019/0344765 A1 Nov. 14, 2019

(30) Foreign Application Priority Data
Aug. 2, 2016 (DE) ...................... 10 2016 009 402.8

(51) Int. Cl.
*B60T 8/36* (2006.01)
*F16K 7/17* (2006.01)
(Continued)

(52) U.S. Cl.
CPC ............ *B60T 8/342* (2013.01); *B60T 8/3605* (2013.01); *B60T 8/362* (2013.01); *B60T 17/046* (2013.01); *F16K 7/17* (2013.01); *F16K 31/08* (2013.01)

(58) Field of Classification Search
CPC ........ B60T 8/342; B60T 8/3605; B60T 8/362; B60T 17/046; F16K 7/17; F16K 31/08
See application file for complete search history.

(56) References Cited

U.S. PATENT DOCUMENTS

| 4,086,036 A * | 4/1978 | Hagen ................. F04B 43/0054 |
| | | 417/413.1 |
| 2011/0175440 A1* | 7/2011 | Eidenschink ......... B60T 8/3675 |
| | | 303/119.1 |

FOREIGN PATENT DOCUMENTS

| DE | 2136446 A1 | 2/1973 |
| DE | 2713599 A1 | 12/1977 |

(Continued)

OTHER PUBLICATIONS

European Patent Office, Rijswijk, Netherlands, International Search Report of International Application No. PCT/EP2017/000858, dated Nov. 7, 2017, 3 pages.

*Primary Examiner* — Marina A Tietjen
(74) *Attorney, Agent, or Firm* — Dickinson Wright PLLC

(57) ABSTRACT

A membrane valve arrangement (1) includes a disc-shaped valve membrane (10) made from an elastic material and a disc (14) having a central opening (15). The valve membrane (10) is arranged with one side on the disc (14) and has a circumferential sealing bead (11) radially outside on the side opposite from the disc. The disc (14) is arranged, along with the valve membrane (10), between a housing upper part (2) and a housing lower part (6) of the membrane valve arrangement (1). The sealing bead (11) is clamped between the housing upper part (2) and the housing lower part (6). The sealing action in the region of the sealing bead is largely independent of tolerances because, on at least one of the housing parts in the region of the sealing bead (11) and/or in the radially outer peripheral region of the disc (14), additional sealing arrangements are present.

17 Claims, 9 Drawing Sheets

(51) Int. Cl.
*B60T 8/34* (2006.01)
*B60T 17/04* (2006.01)
*F16K 31/08* (2006.01)

(56) References Cited

FOREIGN PATENT DOCUMENTS

| | | |
|---|---|---|
| DE | 19638965 C1 | 5/1998 |
| EP | 1408389 A1 | 4/2004 |
| GB | 1399010 A | 6/1975 |
| JP | 2009002442 A * | 1/2009 |
| WO | 2010012425 A1 | 2/2010 |
| WO | 2017102043 A1 | 6/2017 |

* cited by examiner

MEMBRANE VALVE ARRANGEMENT

TECHNICAL FIELD

The invention relates to a membrane valve arrangement, for example in a valve device of an anti-lock braking system of an automobile, exhibiting a disc-shaped valve membrane made from an elastic material and a disc having a central opening, wherein the valve membrane is arranged with one of its two sides on the disc, wherein the valve membrane has a circumferential sealing bead radially outside on its side which is away from the side where the disc is arranged, wherein the disc is arranged along with the valve membrane between a housing upper part and a housing lower part of the membrane valve arrangement, and wherein the sealing bead is clamped between the housing upper part and the housing lower part.

BACKGROUND

A membrane valve arrangement of this kind is known from DE 21 36 446 A (corresponding to GB 1399010 A). The sealing bead in this case is received in a ring groove formed by a housing upper part and a housing lower part. The sealing membrane in this case is supported up to its outer edge by a disc between the housing upper part and the housing lower part. The sealing bead of the sealing membrane is formed on the side facing away from the disc and completely fills the ring groove. The machining tolerances when producing the ring groove mean that although the sealing bead is clamped in the ring groove in the desired manner with a predefined clamping force which is exactly right for a permanent sealing action and does not lead to a hardening of the elastic material of the sealing membrane, it may also be the case that the sealing action is not sufficient or that the sealing bead is pressed too strongly by the clamping force and suffers hardening that damages the sealing membrane during continuous operation.

Against this background, the problem addressed by the invention is that of proposing a membrane valve in which the sealing action in the region of the sealing bead is largely independent of production tolerances and the acting clamping force is improved.

SUMMARY OF THE INVENTION

The present disclosure is based on a membrane valve arrangement, in a valve device of an anti-lock braking system of an automobile, for example, having a disc-shaped valve membrane made from an elastic material and also a disc with a central opening, wherein the valve membrane is arranged with one of its two sides on the disc, wherein the valve membrane has a circumferential sealing bead radially outside on its side which is away from the side where the disc is arranged, wherein the disc is arranged along with the valve membrane between a housing upper part and a housing lower part of the membrane valve arrangement, and wherein the sealing bead is clamped between the housing upper part and the housing lower part. In this membrane valve arrangement, in order to solve the problem posed, it is provided that on the housing upper part and/or on the housing lower part in the region of the sealing bead and/or in the radially outer peripheral region of the disc supporting the valve membrane, additional sealing arrangements are present.

The additional sealing arrangements are configured in such a manner that the sealing action thereof is largely independent of production tolerances and the clamping force acting between the housing upper part and the housing lower part.

As a development of this design principle, it may be provided that the sealing bead of the valve membrane is received in an axial ring groove which is formed by an axial shoulder in the housing upper part and a ring-shaped axial projection of the housing lower part radially surrounding said shoulder, wherein this axial ring groove is dimensioned such that the elastic material of the valve membrane pressed during the clamping of the housing upper part against the housing lower part is displaced and received into at least one receiving space of the ring groove intended therefor, and wherein the at least one receiving space creates the additional sealing arrangement along with the pressed material. The sealing space is preferably a part of the ring groove of this kind which, in the unloaded state, is not therefore filled by the sealing bead of the valve membrane when the housing lower part and the housing upper part have not yet been completely assembled.

It should be mentioned at this point that in the embodiment just mentioned and all the embodiments still to be described, the ring-shaped axial projection of the housing lower part can preferably be produced by a circular recess in the front end of the housing lower part proximate to the housing upper part, without this being separately referred to in each case.

As a development of the invention, it may be provided that the ring groove has at least one axial inclined surface and a radial surface, that the ring groove forms a receiving space in the region of the radial surface which is not filled without the application of axial force on the housing upper part and/or the housing lower part by the sealing bead, and that following the clamping of the housing upper part against the housing lower part, elastic material of the sealing bead of the valve membrane is displaced into the receiving space, wherein the receiving space and the material of the sealing bead displaced therein create the additional axial sealing arrangement.

According to another embodiment, it may be provided that in the ring-shaped axial projection of the housing lower part in the region of the sealing bead a receiving space is formed by a radial circumferential groove which, when the housing upper part is clamped against the housing lower part, receives displaced elastic material of the valve membrane and forms an additional radial and/or axial sealing arrangement.

It may be provided in this case that the radial circumferential groove in the axial projection of the housing lower part forming the receiving space has a circumferential inclined surface, a circumferential axis-parallel surface, and a radial circumferential surface, so that an additional radial sealing action is achieved on the circumferential inclined surface, and that this receiving space along with the displaced material of the sealing bead forms the additional radial sealing arrangement.

Another embodiment envisages that a receiving space is formed by a radial circumferential groove in a radially outer, ring-shaped, axial projection of the disc supporting the valve membrane in the region of the sealing bead, which circumferential groove receives displaced elastic material of the valve membrane when the housing upper part is clamped against the housing lower part and forms an additional radial and/or axial sealing arrangement.

In addition, a ring-shaped gap may be additionally formed between the housing upper part and the housing lower part in the region of an upper side of the sealing bead as the receiving space for the elastic material pressed during the clamping of the housing upper part against the housing lower part, wherein this ring-shaped gap along with the material displaced therein forms an additional radial sealing arrangement.

A further embodiment of the additional sealing arrangement envisages that the radial surface of the housing upper part axially delimiting the ring groove and/or the surface of the disc facing the sealing membrane have an axially oriented ring bead, that in the ring-shaped axial projection of the housing lower part or in the ring-shaped axial projection of the disc a circumferential groove is formed as the receiving space for the elastic material displaced when the housing upper part is clamped against the housing lower part, and that the receiving space formed by the circumferential groove along with the at least one ring bead forms an additional axial sealing arrangement.

It may further be provided that the housing lower part has a ring-shaped radial bearing surface and the disc supporting the valve membrane has a complementary ring surface and that a ring groove for receiving an O-ring is arranged in the bearing surface of the housing lower part and/or in the ring surface of the disc, and wherein the O-ring forms an additional axial sealing arrangement in the ring groove.

A further possibility for creating an additional sealing arrangement in the membrane valve arrangement may be that the housing lower part has a ring-shaped radial bearing surface for the disc supporting the valve membrane, that this bearing surface of the housing lower part or a complementary ring surface facing this bearing surface of the disc supporting the valve membrane is provided with an injection-molded coating of silicone rubber or a vulcanized coating of rubber, wherein the silicone rubber coating injection-molded onto the bearing surface of the housing lower part or onto the complementary ring surface of the disc or the vulcanized rubber coating forms an additional axial sealing arrangement.

Another design of the additional sealing arrangement in the membrane valve arrangement envisages that the outer diameter of the disc supporting the valve membrane is smaller than the inner diameter of the ring-shaped axial projection of the housing lower part and that the ring space thereby created between the disc and the projection is filled by a silicone rubber seal injection-molded onto the radial outer surface of the disc or a rubber seal vulcanized onto the radial outer surface of the disc, wherein the seal injection-molded onto the radial outer surface of the disc forms an additional axial sealing arrangement.

A further embodiment of the additional axial sealing arrangement may involve a circumferential groove for receiving an O-ring being configured in the outer circumference of the disc supporting the valve membrane, wherein the circumferential groove with the O-ring forms an additional axial sealing arrangement. In this case, it may be provided that the circumferential groove has a rectangular cross section or a triangular cross section.

A further possibility for configuring the membrane valve arrangement according to the invention may be for the disc supporting the valve membrane to be sealed in respect of the housing lower part by an adhesive as the sealing agent or by a sealing agent enclosed in microcapsules or by a liquid sealing agent, wherein the sealing agent forms an additional axial and/or radial sealing arrangement.

It may be provided in this case that the sealing agent is arranged at least between a ring-shaped, radial bearing surface on the housing lower part for the disc supporting the valve membrane and a complementary ring surface of the disc facing this bearing surface.

Deviating from this, it may be provided that the sealing agent is arranged between the radial outer surface of the disc supporting the valve membrane and a radial inner surface of the ring-shaped axial projection of the housing lower part.

It may be further provided that the sealing agent is arranged with an L-shaped cross section between the radial outer surface of the disc supporting the valve membrane and the radial inner surface of the ring-shaped axial projection of the housing lower part and between the ring-shaped radial bearing surface on the housing lower part for the disc supporting the valve membrane and a complementary ring surface of the disc facing this bearing surface.

Finally, it may be provided in this context that the sealing agent is arranged with a C-shaped cross section on the radially outer edge of the disc supporting the valve membrane.

A further possibility for realizing an additional sealing arrangement may involve the disc supporting the valve membrane being arranged with a sealing radial interference fit on the housing lower part, wherein the interference fit forms an additional axial sealing arrangement.

Finally, it may be provided that the disc supporting the valve membrane has a ring-shaped axial projection radially enclosing the sealing bead on the valve membrane and that the disc, including its ring-shaped axial projection, is arranged with a sealing radial interference fit on the housing lower part and thereby forms an additional axial sealing arrangement.

The invention is further explained below with the help of a plurality of exemplary embodiments of additional sealing arrangements.

BRIEF DESCRIPTION OF THE DRAWINGS

In the attached drawing.

DETAILED DESCRIPTION OF THE DRAWINGS

In the figures, only a detail of a membrane valve arrangement in a valve device of an anti-lock braking system is depicted with the additional sealing arrangements according to the invention, wherein identical parts are referred to using the same reference numbers. Parts not shown may correspond to the parts of GB 1399010 A discussed above.

Figure 1:
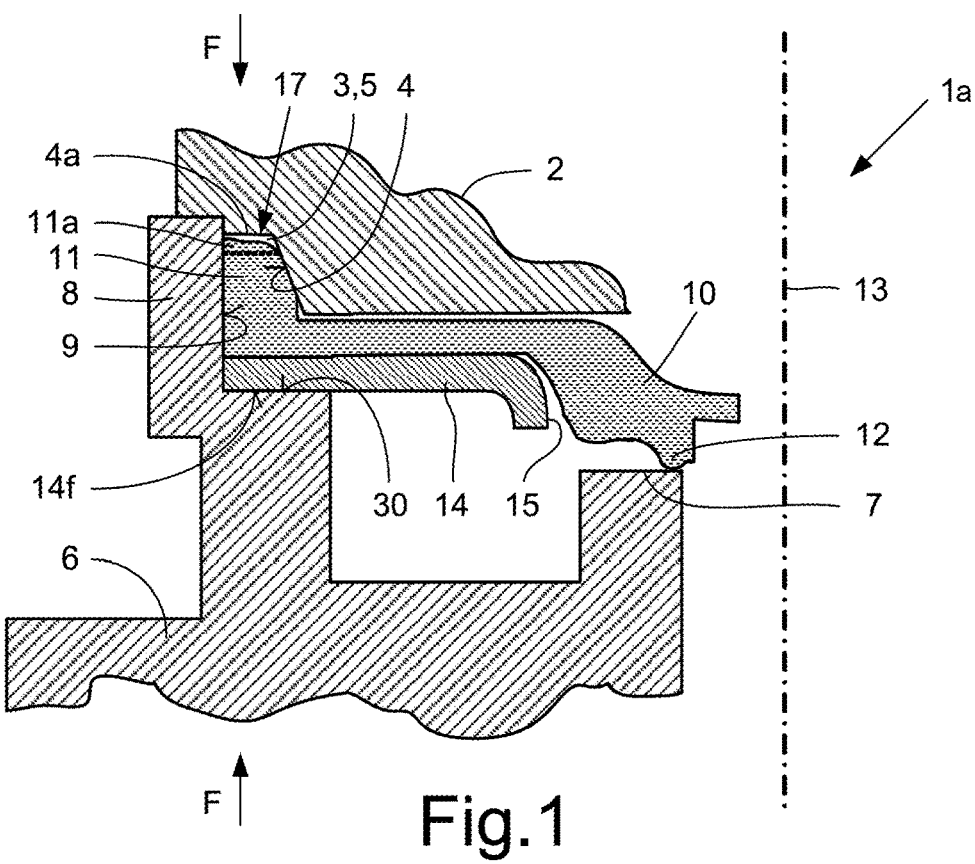
FIGS. 1, 2, 3, and 4 show four different exemplary embodiments of additional sealing arrangements in the region of the sealing bead on the sealing membrane.

The membrane valve arrangement 1*a* depicted in FIG. 1 has a housing upper part 2 and a housing lower part 6 which are joined together with radially external clamping of a valve membrane 10 and a disc 14 axially supporting the valve membrane 10. In the clamping region a ring groove 3 is formed by an axial inclined surface 4 and a radial surface 4*a* on the housing upper part 2 and an axial ring surface 9 on a ring-shaped axial projection 8 of the housing lower part 6. In addition, the housing lower part 6 has a valve seat 7 for a sealing lip 12 formed on the valve membrane 10 radially adjacent to a center axis 13 of the membrane valve arrangement 1*a*.

A sealing bead 11 is configured radially externally on the valve membrane 10, which sealing bead is received in the axial ring groove 3 formed by the axial inclined surface 4, the radial surface 4a, and the ring surface 9. In this case, this ring groove 3 is dimensioned such that that a receiving space 5 is present below the radial surface 4a of the housing upper part 2, in which receiving space there is no sealing bead 11 material when the housing parts 2, 6 have not yet been finally assembled.

Arranged axially between the valve membrane 10 and the housing lower part 6 is the disc 14 supporting the valve membrane 10, which disc has an axial opening 15 adjacent to the sealing lip 12 of the valve membrane 10. This disc 14 lies with its complementary ring surface 14f axially on a ring-shaped bearing surface 30 of the housing lower part 6.

As soon as the housing upper part 2 and the housing lower part 6 are joined together with a clamping force F and are thereby clamped against one another, the sealing bead 11 originally configured in a largely rectangular form in the axial section is pressed together radially in the ring groove 3 formed from the axial inclined surface 4, the radial surface 4a, and the ring surface 9 on the ring-shaped axial projection 8. In this case, material of the sealing bead 11 is displaced in the direction of the receiving space 5 which is partially filled by the displaced elastic material 11a in a discernible manner.

Compared with the prior art as described above which shows the one rectangular ring groove for receiving a rectangular sealing bead with the same cross section on the valve membrane 10, in the embodiment according to FIG. 1 an additional sealing arrangement is formed by the ring groove 3 from the axial inclined surface 4 and the radial surface 4a in the housing upper part 2 and also the ring surface 9 on the ring-shaped axial projection 8 of the housing lower part 6 in conjunction with the plastically deformed sealing bead 11 and the elastic material 11a displaced into the receiving space 5. In this case, the receiving space 5 is dimensioned such that under unfavorable tolerance conditions it is not completely filled by the displaced elastic material 11a of the sealing bead 11. This means that no excessively high clamping forces F act on the sealing bead 11, which could otherwise lead to a disadvantageous hardening of the elastic material of the valve membrane 10. The described embodiment of the receiving space 5 in the ring groove 3 and the elastic material 11a of the sealing bead 11 displaced therein mean that an axial extension of the effective sealing surface of the sealing bead 11 has advantageously been achieved, as a result of which an additional axial sealing arrangement is formed which leads to an improved seal overall.

Figure 2:
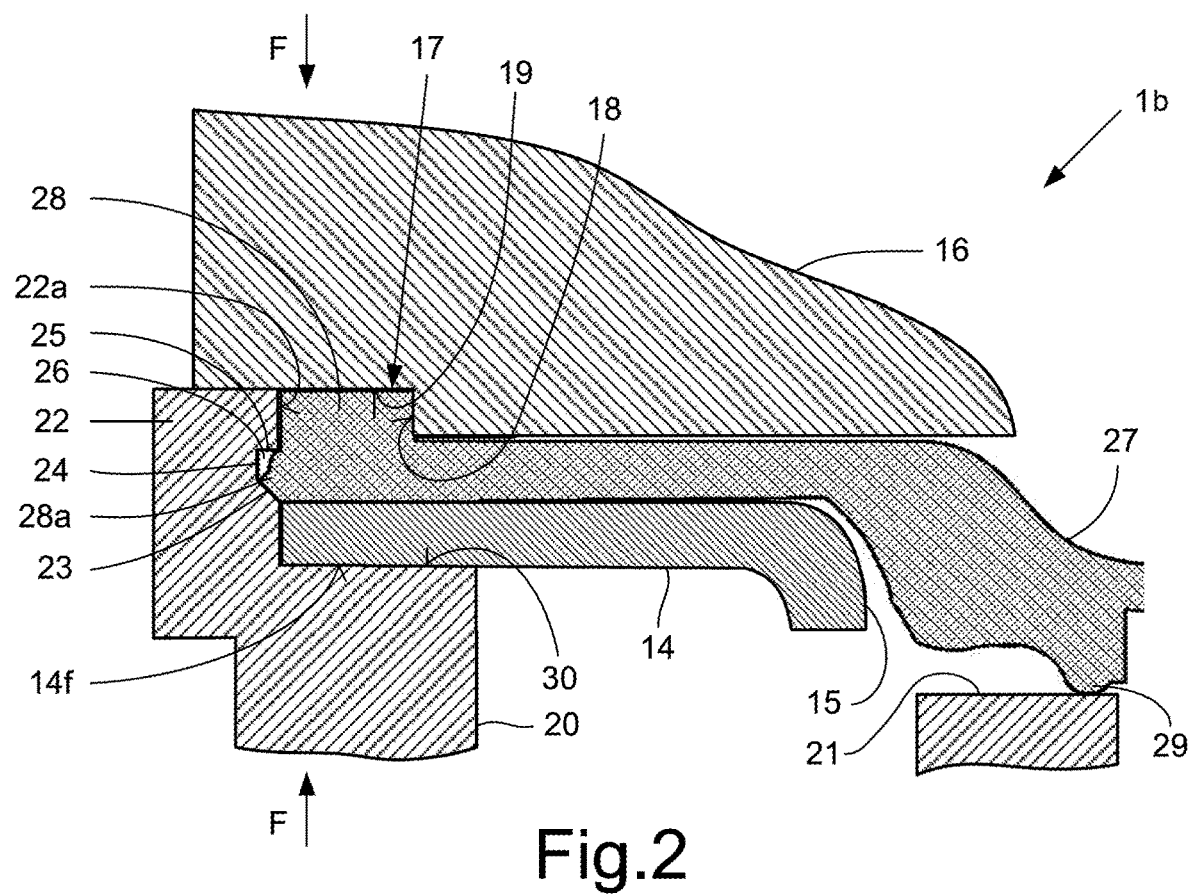

The embodiment according to FIG. 2 shows a sectional depiction of a membrane valve arrangement 1b with a housing upper part 16 and a housing lower part 20 between which a valve membrane 27 and a disc 14 supporting said valve membrane 27 are likewise clamped radially outside. The housing upper part 16 has an axis-parallel surface 18 and a radial surface 19 attached thereto radially inside. On the housing lower part 20 an axial ring surface 22a is configured radially inside, which ring surface is configured on a ring-shaped axial projection 22 of the housing lower part 20. The axial projection 22 may have been produced by a circular recess on the front end proximate to the housing upper part of the housing lower part 20. The aforementioned surfaces 18, 19, 22a together form a rectangular ring groove 17. A sealing bead 28 configured radially outside on the valve membrane 27 is arranged in this ring groove 17, which sealing bead has a rectangular cross section in the axial section.

This valve membrane 27 also lies radially inside with a sealing lip 29 on a valve seat 21 which is configured radially internally on the housing lower part 20. The valve membrane 27 is supported axially by a disc 14 which lies with a ring surface 14f on an associated bearing surface 30 of the housing lower part 20. In this case, the valve membrane 27 and the disc 14 are clamped by a clamping force F between the housing lower part 20 and the housing upper part 16.

In the aforementioned axial ring surface 22a in the axial projection 22 of the housing lower part 20 is configured a circumferential groove formed by a circumferential inclined surface 23, an axis-parallel surface 24 and a radial circumferential surface 25, which circumferential groove is dimensioned such that an elastic material 28a of the sealing bead 28 displaced during the clamping of the housing upper part 16 against the housing lower part 20 only partially fills a receiving space 26 formed by the circumferential groove, wherein the receiving space 26 forms an additional sealing arrangement along with the displaced material 28a.

Figure 3:
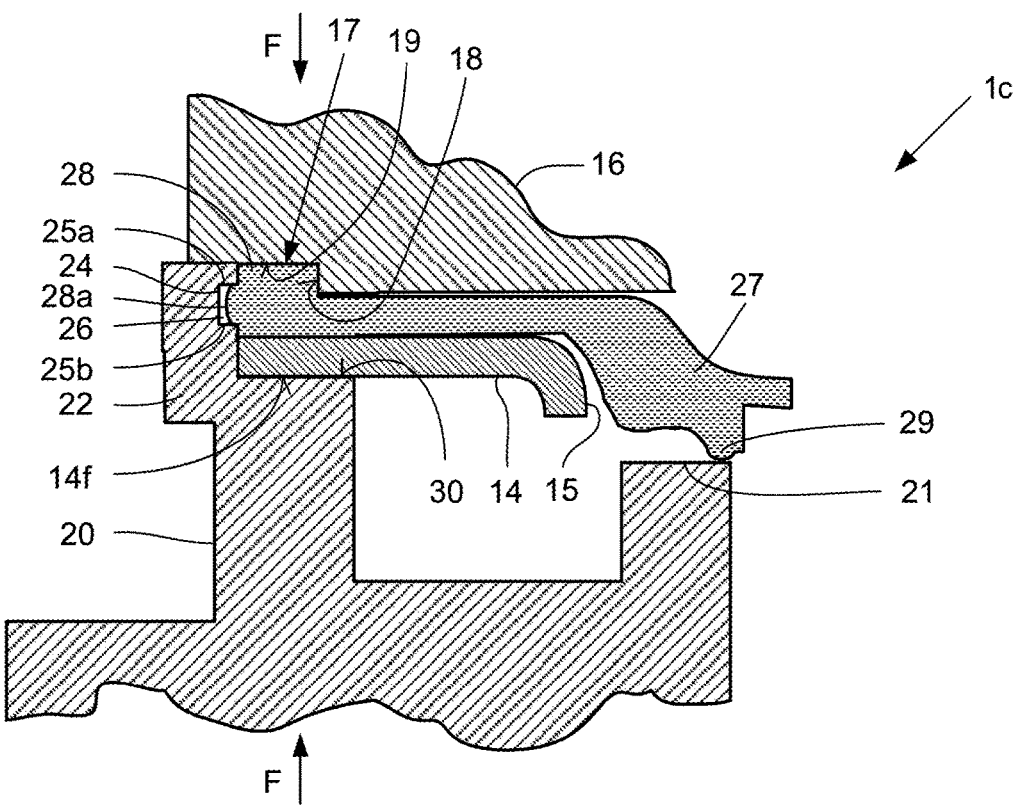

The membrane valve arrangement 1c according to FIG. 3 only differs from the membrane valve arrangement 1b according to FIG. 2 in that the ring groove or else the receiving space 26 is formed in the axial projection 22 of the housing lower part 20 in rectangular form from an axis-parallel surface 24 and two parallel radially circumferential surfaces 25a, 25b into which the elastic material 28a of the sealing bead 28 is displaced without the receiving space 26 being completely filled. An additional axial and radial sealing arrangement is formed by the receiving space 26 in conjunction with the elastic material 28a displaced therein.

Figure 4:
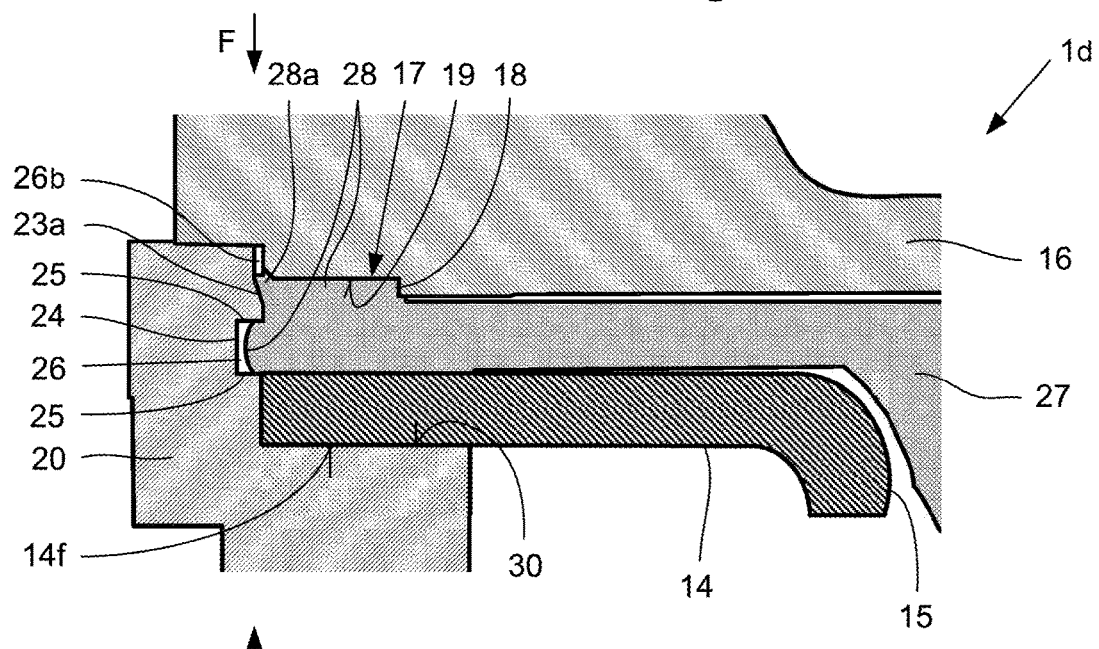

According to FIG. 4, an additional sealing arrangement on a membrane valve arrangement 1d can also be formed by a circumferential inclined surface 23a on the ring-shaped axial projection 22 of the housing lower part 20 and a gap 26b as the receiving space between the ring-shaped axial projection 22 on the housing lower part 20 and the housing upper part 16 into which displaced elastic material 28a can move without the gap 26b being completely filled. With this membrane valve arrangement 1d two additional sealing arrangements are therefore formed at an axial distance from one another, namely the receiving space 26 and the gap 26b.

Figure 5:
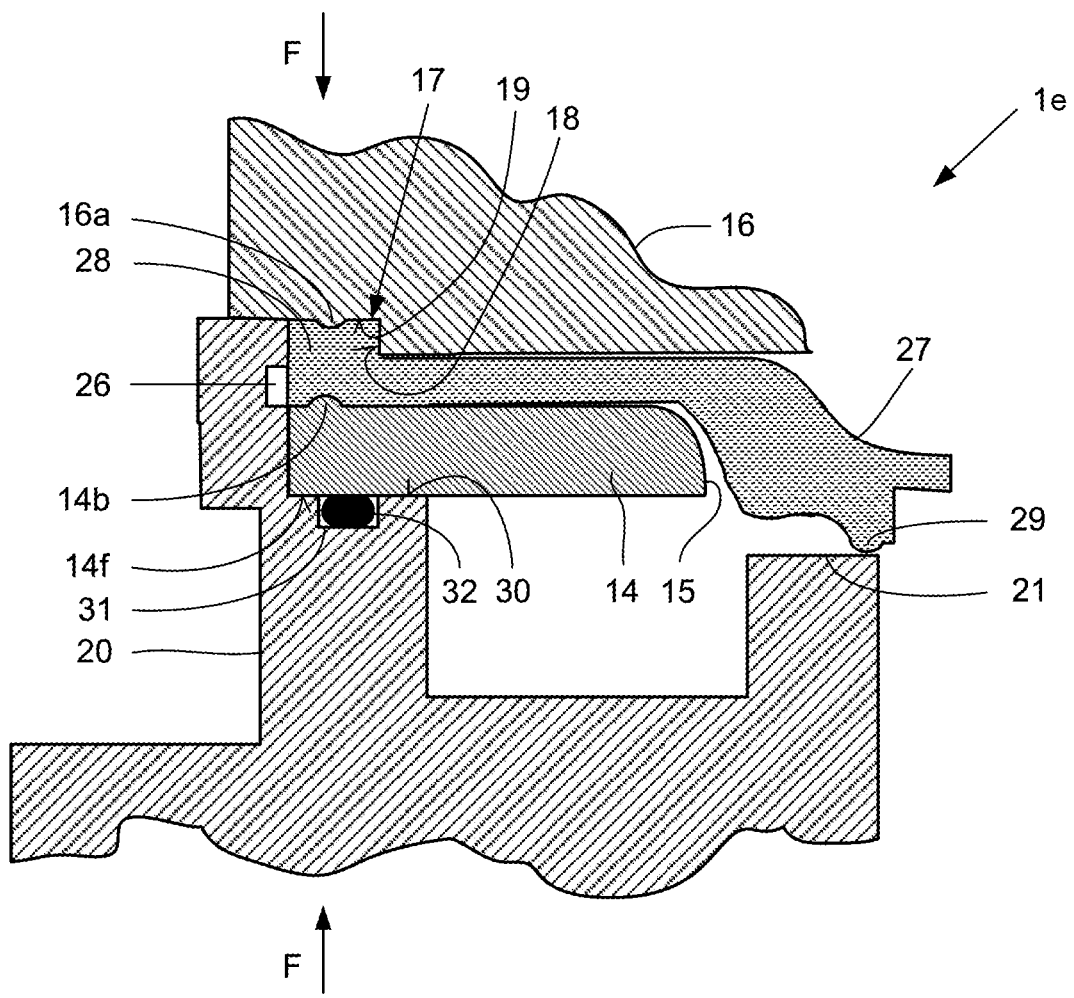
FIGS. 5, 6, 7, 8, 9, 10, 11, 12, 13, 14, 15, 16, 17, 18, 19, and 20 show additional sealing arrangements in the region of a disc supporting a valve membrane.

The membrane valve arrangement 1e according to FIG. 5 differs from the membrane valve arrangements according to FIGS. 2 to 4 in that the sealing bead 28 with a rectangular cross section is arranged on the valve membrane 27 in the ring groove 17 formed from the axis-parallel surface 18 and the radial surface 19 on the housing upper part 16 and the ring-shaped axial projection 22 and has the same dimensions as the ring groove 17, except for the tolerance differences. In order to compress the region of the valve membrane 27 with the sealing bead 28 under the action of the clamping force F to the required extent, the housing upper part 16 has in the groove-related radial surface 19 thereof an axially inwardly projecting ring bead 16a, while the disc 14a supporting the valve membrane 27 is provided with an axially outwardly facing ring groove 14b. In this way, elastic material of the sealing bead 28 is displaced into a circumferential groove in the projection 22 forming a receiving space 26 for the displaced elastic material, as a result of which a first additional sealing arrangement is formed. Furthermore, a ring groove 31 for receiving an O-ring 32 is arranged in the housing lower part 20 in the region of the bearing surface 30 for the disc 14a supporting the valve membrane 27, as a result of which a second additional radial sealing arrangement is formed.

The embodiments according to FIGS. 6 to 11 show additional sealing arrangements on membrane valve arrangements 1f, 1g, 1h in conjunction with the disc 14, 14c supporting the valve membrane 27.

Figure 6:
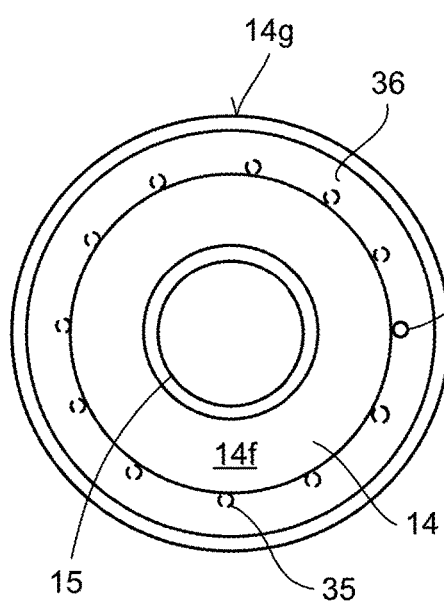
Figure 7:
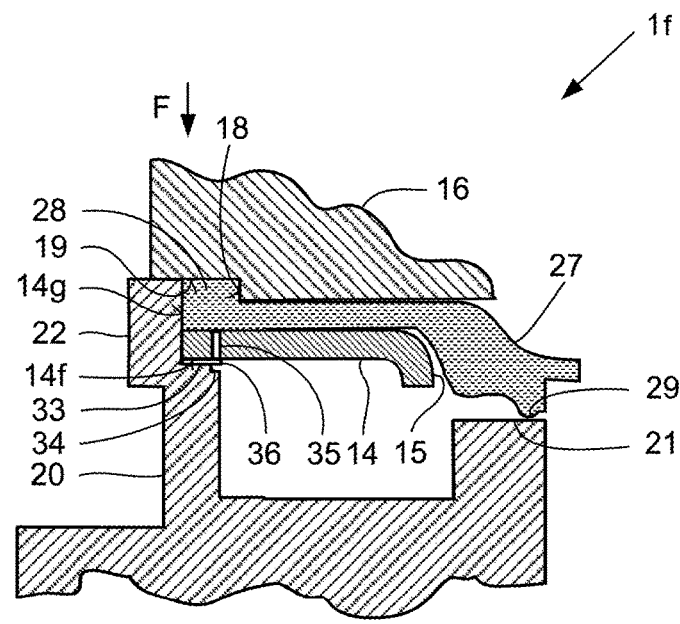

According to FIGS. 6 and 7, a coating 36 of LSR or rubber is injection-molded or vulcanized onto the disc 14 supporting the valve membrane 27. The LSR (LSR=Liquid Silicone Rubber) is injection-molded from a sprue opening 34, wherein for improved adhesion to the disc 14 supporting the valve membrane 27, a plurality of axial bores 35 is configured distributed in a uniform and ring-shaped manner in the disc 14 supporting the valve membrane 27. The injection-molded or vulcanized LSR or rubber coating 36 lies on a bearing surface 33 of the housing lower part 20 and seals the disc 14 axially and radially in respect of the ring-shaped axial projection 22 of the housing lower part 20.

Figure 8:
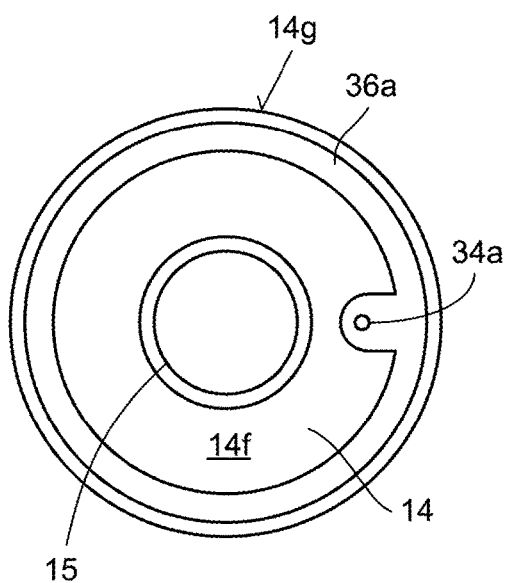
Figure 9:
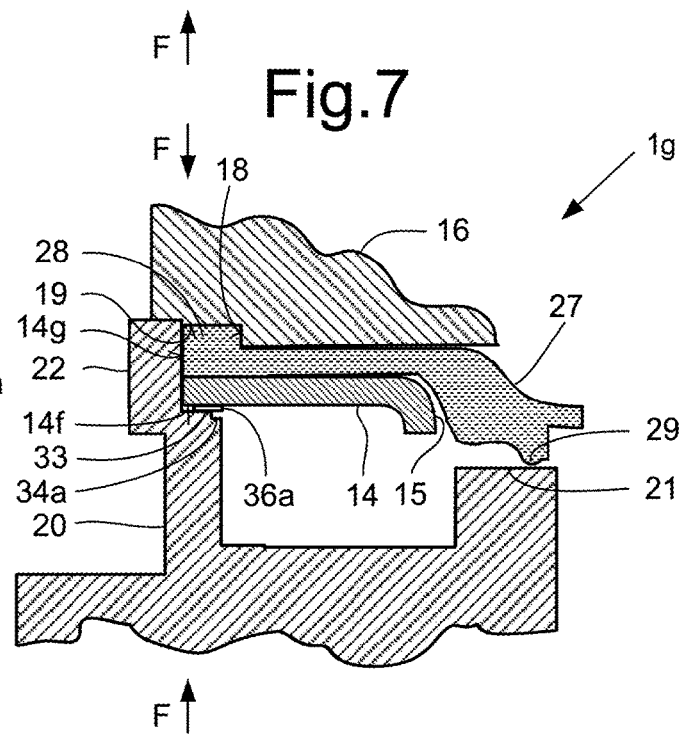

The embodiment of the membrane valve arrangements 1g according to FIGS. 8 and 9 differs from the embodiment according to FIGS. 6 and 7 in that no axial bores 35 are formed in the disc 14 and that a sprue opening 34a is arranged displaced radially inwardly, as a result of which the injection-molded or vulcanized coating 36a can be produced from LSR or rubber in a comparatively narrower form.

Figure 10:
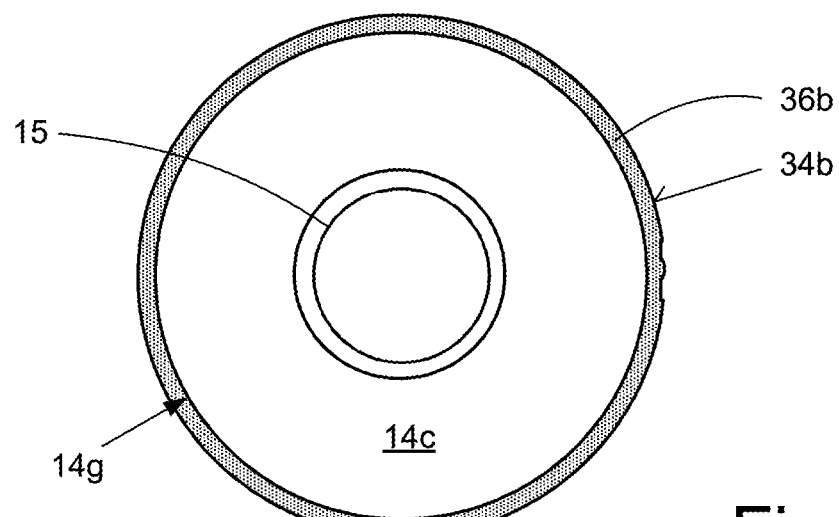
Figure 11:
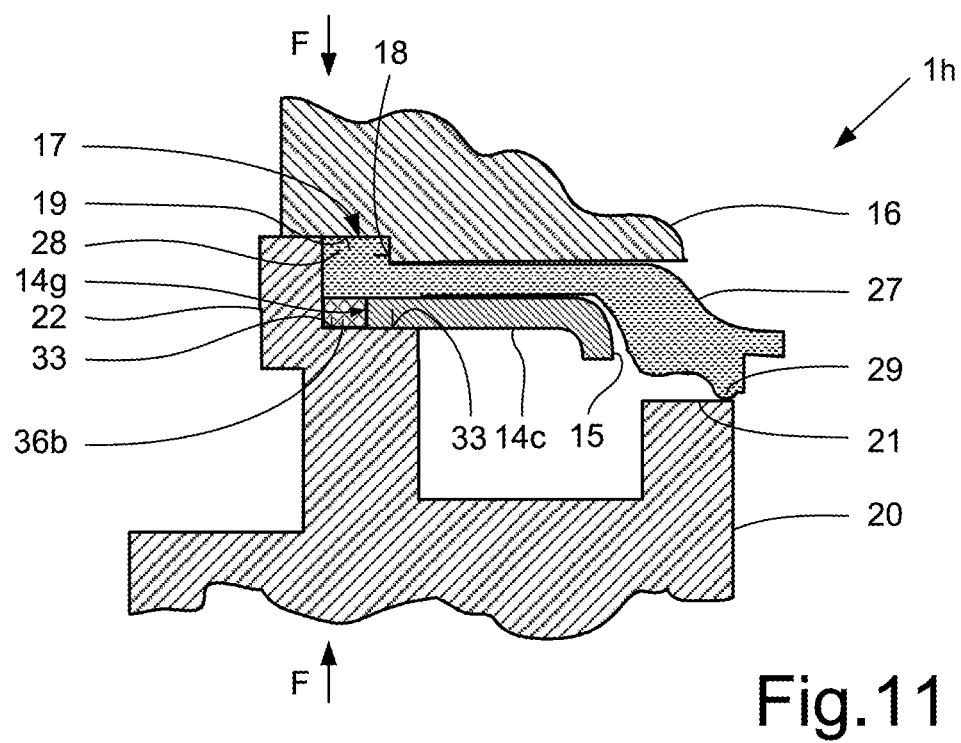
Figure 12:
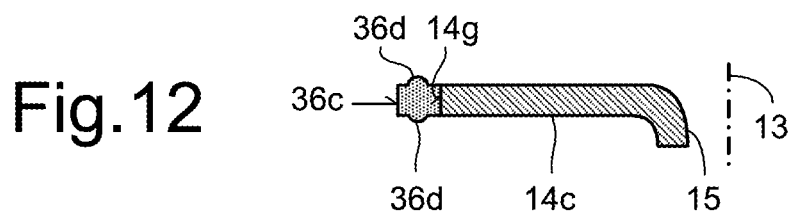

The embodiment of the membrane valve arrangements 1h according to FIGS. 10 to 12 differs from that of the membrane valve arrangements according to FIGS. 6 to 9 in that the diameter of the radial outer surface 14g of the disc 14c supporting the valve membrane 27 is smaller than the inner diameter of the ring-shaped axial projection 22 on the housing lower part 20. A seal 36b is injection-molded or vulcanized onto the radial outer surface 14g of the disc 14c via a sprue opening 34b, which seal is made of LSR or rubber and the ring space between the disc 14c, the valve membrane 27, the ring-shaped radial projection 22 on the housing lower part 20, and the bearing surface 33 for the disc 14c supporting the valve membrane 27 is filled in such a manner that an additional axial and radial sealing arrangement is formed.

As shown by the longitudinal sectional view according to FIG. 12, the silicone rubber or rubber seal 36b injection-molded radially outside onto the disc 14c may have two ring beads 36c, 36d facing in opposite axial directions which are pressed during the assembly of the housing upper part 16 and the housing lower part 20 in a sealing manner into correspondingly assigned receiving grooves, for example.

Figure 13:
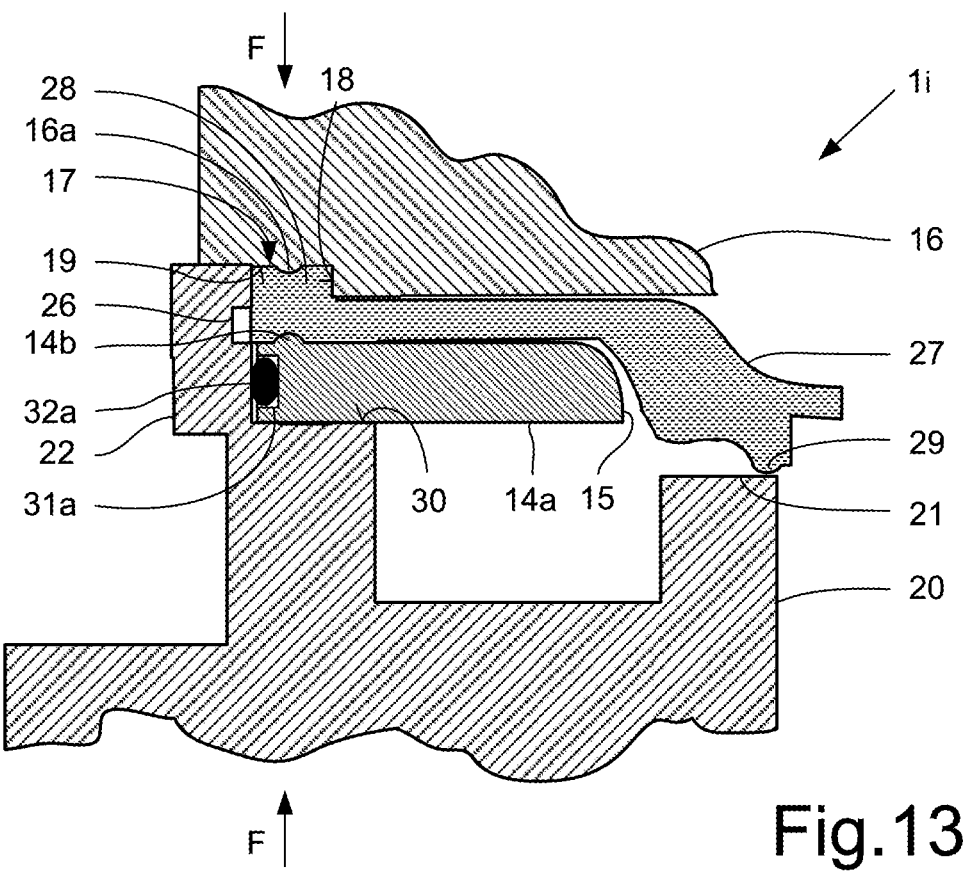
Figure 14:
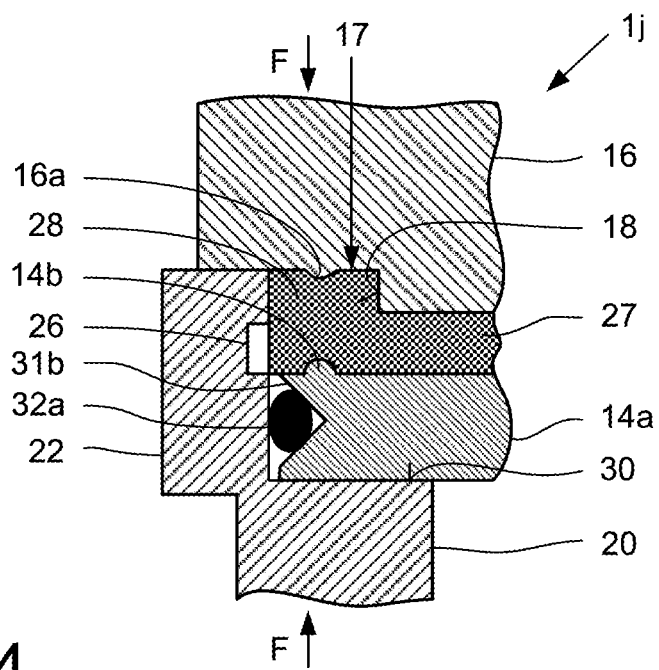

The embodiment of the membrane valve arrangements 1i, 1j according to FIGS. 13 and 14 differ from the embodiment according to FIG. 5 only in that a radial ring groove 31a, 31b for receiving an O-ring 32a is configured in the outer circumference of the disc 14a supporting the valve membrane 27 in each case. This O-ring 32a is used for the axial and radial sealing of the disc 14a supporting the valve membrane 27 in respect of the ring-shaped axial projection 22 on the housing lower part 20 in an axial direction.

According to FIG. 13, the ring groove 31a in the disc 14a has a rectangular cross section, while the ring groove 31b in the embodiment according to FIG. 14 has a triangular cross section. As in the embodiment according to FIG. 5, the sealing bead 28 of the valve membrane 27 is sealed by the axially oriented ring bead 14b on the disc 14a and the axially oriented ring bead 16a on the radial surface 19 of the housing upper part 16 in a radial direction. As in the embodiment according to FIG. 5, the elastic material pressed by the mutual clamping of the housing upper part 16 in respect of the housing lower part 20 of the clamping force F reaches the circumferential groove 26 which is formed in the ring-shaped axial projection 22 of the housing lower part 20.

Figure 15:
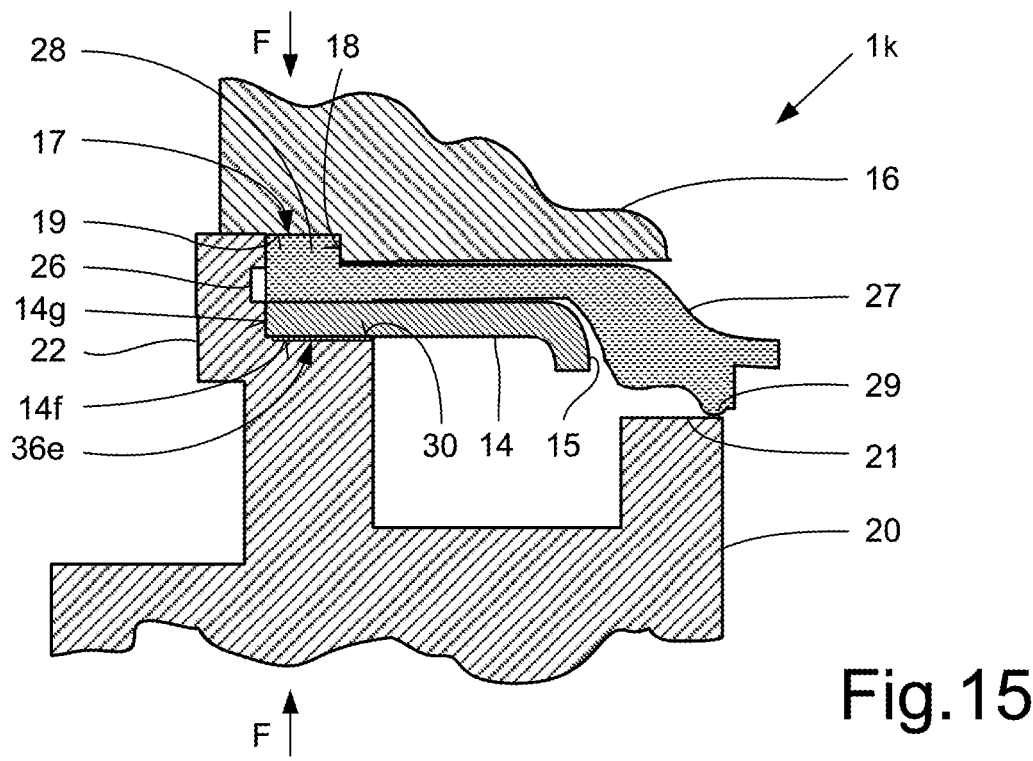

The embodiments of the membrane valve arrangements 1k, 1l, 1m, 1n according to FIGS. 15 to 18 differ from the membrane valve arrangements 1f, 1g embodiment according to FIGS. 6 to 9 in that according to FIG. 15 an adhesive layer 36e is arranged as a sealing agent between the bearing surface 30 on the housing lower part 20 and the complementary ring surface 14f on the disc 14 supporting the valve membrane 27.

Figure 16:
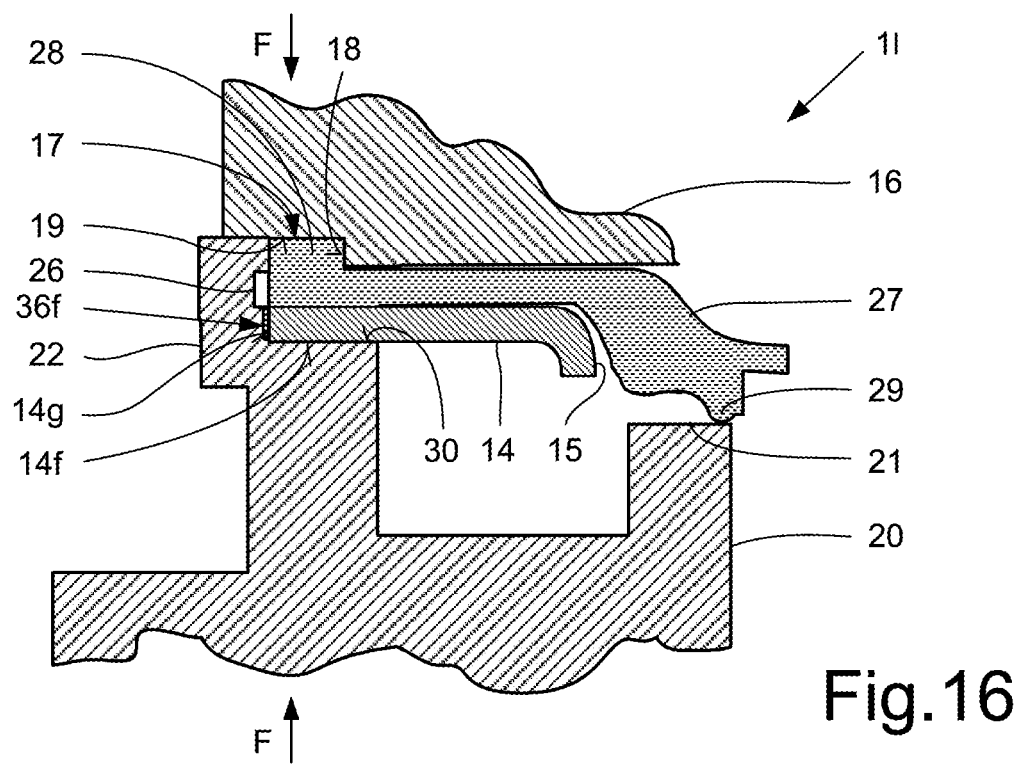

According to the variant shown in FIG. 16, this sealing agent 36f is arranged between the radial outer surface 14g of the disc 14 supporting the valve membrane 27 and the ring-shaped axial projection 22 of the housing lower part 20.

Figure 17:
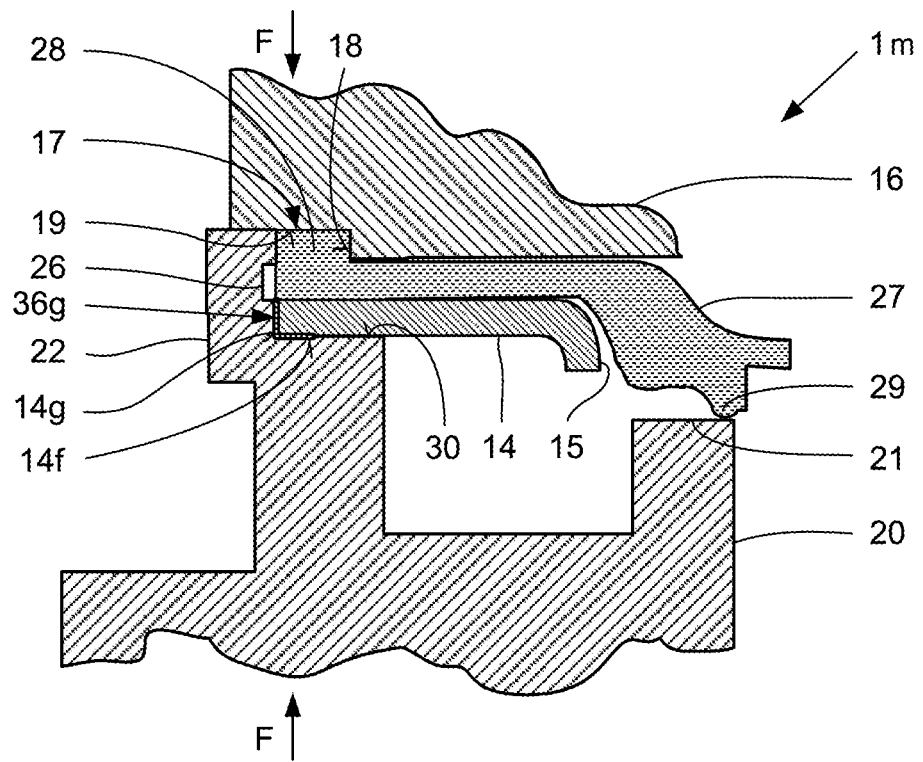

In the variant according to FIG. 17 the sealing agent 36g is L-shaped viewed in cross section and arranged on the disc 14 supporting the valve membrane 27 in the region of the bearing surface 30 on the housing lower part 20 and the ring-shaped radial projection 22 of the housing lower part 20.

Figure 18:
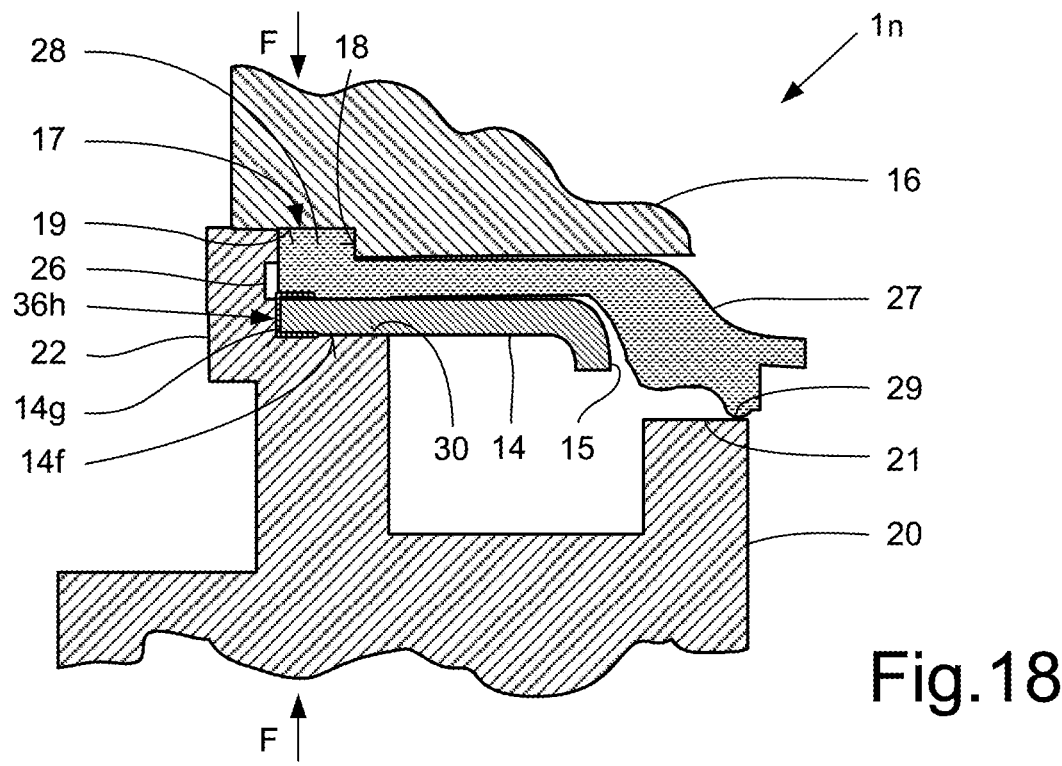

According to the variant shown in FIG. 18, the sealing agent 36h is arranged in a C-shaped configuration viewed in cross section on all sides on the radially outer peripheral region of the disc 14 supporting the valve membrane 27.

The sealing agent in all the aforementioned examples according to FIGS. 15 to 18 may be made of an adhesive or a sealing agent enclosed in microcapsules or of a liquid sealing agent that is settable but remains elastic which form further additional sealing arrangements.

Figure 19:
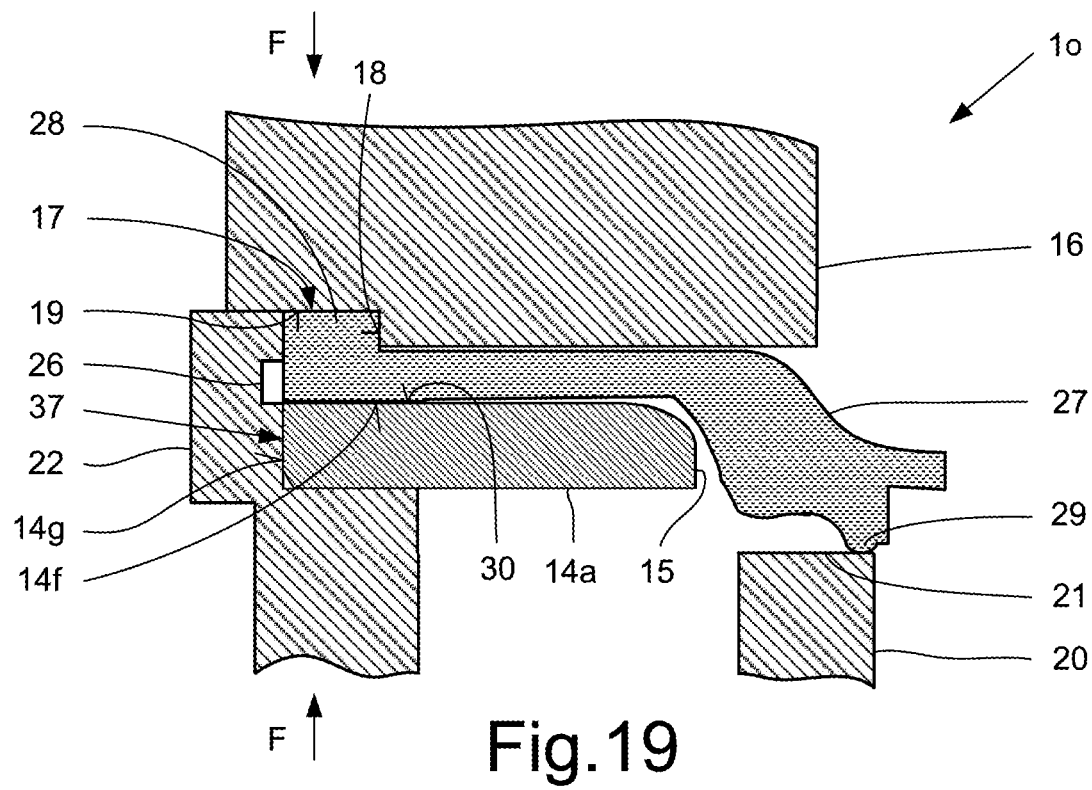
Figure 20:
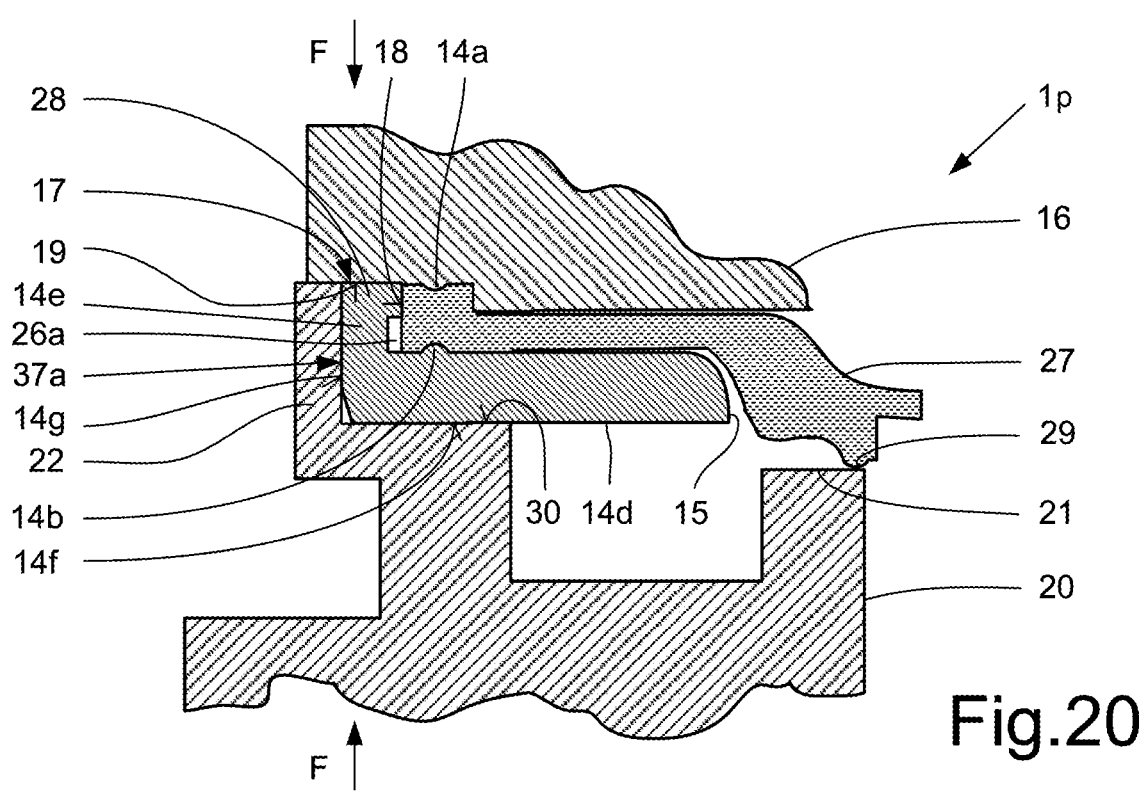

Finally, it is also possible for further additional sealing arrangements to be configured on membrane valve arrangements 1o, 1p according to FIGS. 19 and 20 which, according to FIG. 19, involves the disc 14a supporting the valve membrane 27 being fitted with a sealing interference fit 37 in the ring-shaped radial projection 22 of the housing lower part 20. Similarly, according to FIG. 20 the disc 14d supporting the valve membrane 27 may have a ring-shaped axial projection 14e which is fitted with a sealing interference fit 37a into the ring-shaped radial projection 22 of the housing lower part 20.

All depicted and described embodiments according to FIGS. 1 to 20 are based on the assumption that additional sealing arrangements between the housing upper part 2, 16 and the housing lower part 6, 20 allow the clamping force F to be more effectively monitored and adjusted. In this way, it is guaranteed that the sealing bead 11, 28 is not damaged by an excessively high clamping force F, wherein, however, the sealing action between the housing upper part 2, 16 and the housing lower part 6, 20 is improved.

All features referred to in the above figure description, in the claims and in the introduction to the description can be used both individually and also in any combination with one another. The invention is not therefore limited to the combinations of features described and claimed; instead all feature combinations should be regarded as disclosed.

The invention claimed is:

1. A membrane valve arrangement (1a, 1b, 1c, 1d, 1e, 1f, 1g, 1h, 1i, 1j, 1k, 1l, 1m, 1n, 1o, 1p) comprising:
 a disc-shaped valve membrane (10, 27) made from an elastic material and a disc (14, 14a, 14c, 14d) having a central opening (15),
 wherein the valve membrane (10, 27) has a first side and a second side and is arranged with the first side on the disc (14, 14a, 14c, 14d), wherein the valve membrane (10, 27) has a circumferential sealing bead (11, 28) radially outside on the second side away from the first side where the disc is arranged,
 wherein the disc (14, 14a, 14c, 14d) is arranged along with the valve membrane (10, 27) between a housing upper part (2, 16) and a housing lower part (6, 20) of the membrane valve arrangement (1), wherein the sealing bead (11, 28) is clamped between the housing upper part (2, 16) and the housing lower part (6, 20), and wherein at least one additional sealing arrangement is present, at least on the housing upper part (2, 16) or on the housing lower part (6, 20), in the region of the sealing bead (11, 28) or in a radially outer peripheral region of the disc (14, 14*a*, 14*c*, 14*d*) supporting the valve membrane (10, 27);

wherein the sealing bead (11, 28) of the valve membrane (10, 27) is received in an axial ring groove (3, 17) formed by an axial shoulder in the housing upper part (2, 16) and a ring-shaped axial projection (8, 22) of the housing lower part (6, 20) radially surrounding the axial shoulder, wherein this axial ring groove (3, 17) is dimensioned such that the elastic material (11*a*, 28*a*) of the valve membrane (10, 27), which during the clamping of the housing upper part (2, 16) is pressed against the housing lower part (6, 20), is received into at least one receiving space (5, 26, 26*a*, 26*b*) of the ring groove (3, 17), and wherein the at least one receiving space (5; 26; 26*a*; 26*b*) creates one of the at least one additional sealing arrangement along with the pressed elastic material (11*a*, 28*a*); and wherein in the ring-shaped axial projection (22) of the housing lower part (20) surrounding the sealing bead (28), a receiving space (26) is formed by a radial circumferential groove which, when the housing upper part (16) is clamped against the housing lower part (20), receives pressed elastic material (28*a*) of the valve membrane (27) and forms the one of the at least one additional sealing arrangement, wherein the radial circumferential groove in the axial projection (22) of the housing lower part (20) forming the receiving space (26) has a circumferential inclined surface (23), a circumferential axis-parallel surface (24), and a radial circumferential surface (25), so that an additional radial sealing action is achieved on the circumferential inclined surface (23), wherein the receiving space (26), along with the pressed material (28*a*) of the sealing bead (28), forms the one of the at least one additional radial sealing arrangement.

2. The membrane valve arrangement (1*a*) as claimed in claim 1, wherein the ring groove (3) has at least one inclined axial surface (4) and a radial surface (4*a*), that the ring groove (3) forms one of the at least one receiving space (5), wherein the ring groove proximate to the radial surface is only filled with the elastic material (11*a*) of the sealing bead (11) by the application of axial force on at least one of the housing upper part (2) or the housing lower part (6), and wherein, in a clamped state of the housing upper part (2) against the housing lower part (6), elastic material (11*a*) of the sealing bead (11) of the valve membrane (10, 27) is pressed into the one of the at least one receiving space (5), wherein the receiving space (5) and the material (11*a*) of the sealing bead (11) pressed therein create the one of the at least one additional axial sealing arrangement.

3. The membrane valve arrangement (1*d*) as claimed in claim 1, wherein an additional ring-shaped gap is formed between the housing upper part (16) and the housing lower part (20) above the sealing bead (28), the ring-shaped gap forming another one of the at least one receiving space (26*b*) for the elastic material (28*a*) pressed during the clamping of the housing upper part (16) against the housing lower part (20), wherein this ring-shaped gap along with the material (28*a*) pressed therein forms an additional radial sealing arrangement.

4. The membrane valve arrangement (1*e*, 1*i*, 1*j*, 1*n*) as claimed in claim 1, wherein the housing upper part (16) or the disc (14, 14*a*, 14*d*) has an axially oriented ring bead (16*a*, 14*b*), that delimits a circumferential groove as a receiving space (26, 26*a*) for the elastic material (28*a*) being displaced when the housing upper part (16) is clamped against the housing lower part (20), and that the receiving space (26, 26*a*) formed by the circumferential groove along with the at least one ring bead (16*a*, 14*b*) forms one of the at least one additional axial sealing arrangement.

5. The membrane valve arrangement (1*e*) as claimed in claim 1, wherein the housing lower part (20) has a ring-shaped radial bearing surface (30) and the disc (14*a*) supporting the valve membrane (27) has a complementary ring surface (14*f*), and a ring groove (31) for receiving an O-ring (32) is arranged in at least one of the ring-shaped radial bearing surface (30) and the ring surface (14*f*), and wherein the O-ring (32) forms one of the at least one additional axial sealing arrangement in the ring groove (31).

6. The membrane valve arrangement (1*f*, 1*g*, 1*k*) as claimed in claim 1, wherein the housing lower part (20) has a ring-shaped radial bearing surface (30) for the disc (14) supporting the valve membrane (27), that the bearing surface (30) or a complementary ring surface (14*f*) of the disc (14) facing the bearing surface (30) bears a coating made injection-molded silicone rubber or of vulcanized rubber, wherein the coating, in connection with the bearing surface (30) of the housing lower part (20) and the complementary ring surface (14*f*) of the disc (14), forms one of the at least one additional axial sealing arrangement.

7. The membrane valve arrangement (1*h*) as claimed in claim 1, wherein the outer diameter of the disc (14*c*) supporting the valve membrane (27) is smaller than the inner diameter of the ring-shaped axial projection (22) of the housing lower part (20) and that the ring space thereby created between the disc (14*c*) and the projection (22) is filled by a silicone rubber seal (36*b*) injection-molded onto a radial outer surface (14*g*) of the disc (14*c*) or a rubber seal (36*b*) vulcanized onto the radial outer surface, wherein the seal (36*b*) injection-molded onto the radial outer surface (14*g*) of the disc (14*c*) forms one of the at least one additional axial sealing arrangement.

8. The membrane valve arrangement (1*i*) as claimed in claim 1, wherein a circumferential groove (31*a*, 31*b*) for receiving an O-ring (32*a*) is configured in an outer circumference of the disc (14*a*) supporting the valve membrane (27), wherein the circumferential groove (31*a*, 31*b*) with the O-ring (32*a*) forms one of the at least one additional axial sealing arrangement.

9. The membrane valve arrangement (1*i*) as claimed in claim 8, wherein the circumferential groove (31*a*, 31*b*) has a rectangular cross section or a triangular cross section.

10. The membrane valve arrangement (1*k*, 1*l*, 1*m*, 1*n*) as claimed in claim 1, wherein the disc (14) supporting the valve membrane (27) is sealed against the housing lower part (20) by a sealing agent that is made of an adhesive, that is enclosed in microcapsules, or that is liquid, wherein the sealing agent (36*e*, 36*f*, 36*g*, 36*h*) forms one of the at least one additional sealing arrangement.

11. The membrane valve arrangement (1*k*) as claimed in claim 10, wherein the sealing agent (36*e*) is arranged at least between a ring-shaped, radial bearing surface (30) on the housing lower part (20) and a complementary ring surface (14*f*) of the disc (14) facing the bearing surface (30).

12. The membrane valve arrangement (1*l*) as claimed in claim 10, wherein the sealing agent (36*f*) is arranged between a radial outer surface (14*g*) of the disc (14) supporting the valve membrane (27) and a radial inner surface of the ring-shaped axial projection (22) of the housing lower part (20).

13. The membrane valve arrangement (1*m*) as claimed in claim 10, wherein the sealing agent (36*g*) is arranged with an L-shaped cross section between a radial outer surface (14*g*) of the disc (14) supporting the valve membrane (27) and a radial inner surface of the ring-shaped axial projection (22) of the housing lower part (20) and further between a ring-shaped radial bearing surface (30) on the housing lower part (20) and a complementary ring surface (14*f*) of the disc (14) facing the bearing surface (30).

14. The membrane valve arrangement (1*n*) as claimed in claim 10, wherein the sealing agent (36*g*) is arranged with a C-shaped cross section on a radially outer edge of the disc (14) supporting the valve membrane (27).

15. The membrane valve arrangement (1*o*, 1*p*) as claimed in claim 1, wherein the disc (14*a*, 14*d*) supporting the valve membrane (27) is arranged with a sealing radial interference fit (37, 37*a*) on the housing lower part (20), wherein the interference fit (37, 37*a*) forms one of the at least one additional sealing arrangement.

16. The membrane valve arrangement (1*p*) as claimed in claim 1, wherein the disc (14*d*) supporting the valve membrane (27) has a ring-shaped axial projection (14*e*) radially enclosing the sealing bead (28) on the valve membrane (27) and wherein the disc (14*d*), including the ring-shaped axial projection (14*e*), is arranged with a sealing radial interference fit (37*a*) on the housing lower part (20).

17. A membrane valve arrangement (1*a*, 1*b*, 1*c*, 1*d*, 1*e*, 1*f*, 1*g*, 1*h*, 1*i*, 1*j*, 1*k*, 1*l*, 1*m*, 1*n*, 1*o*, 1*p*) comprising:
a disc-shaped valve membrane (10, 27) made from an elastic material and a disc (14, 14*a*, 14*c*, 14*d*) having a central opening (15),
wherein the valve membrane (10, 27) has a first side and a second side and is arranged with the first side on the disc (14, 14*a*, 14*c*, 14*d*), wherein the valve membrane (10, 27) has a circumferential sealing bead (11, 28) radially outside on the second side away from the first side where the disc is arranged,
wherein the disc (14, 14*a*, 14*c*, 14*d*) is arranged along with the valve membrane (10, 27) between a housing upper part (2, 16) and a housing lower part (6, 20) of the membrane valve arrangement (1),
wherein the sealing bead (11, 28) is clamped between the housing upper part (2, 16) and the housing lower part (6, 20), and
wherein at least one additional sealing arrangement is present, at least on the housing upper part (2, 16) or on the housing lower part (6, 20), in the region of the sealing bead (11, 28) or in a radially outer peripheral region of the disc (14, 14*a*, 14*c*, 14*d*) supporting the valve membrane (10, 27);
wherein the sealing bead (11, 28) of the valve membrane (10, 27) is received in an axial ring groove (3, 17) formed by an axial shoulder in the housing upper part (2, 16) and a ring-shaped axial projection (8, 22) of the housing lower part (6, 20) radially surrounding the axial shoulder, wherein this axial ring groove (3, 17) is dimensioned such that the elastic material (11*a*, 28*a*) of the valve membrane (10, 27), which during the clamping of the housing upper part (2, 16) is pressed against the housing lower part (6, 20), is received into at least one receiving space (5, 26, 26*a*, 26*b*) of the ring groove (3, 17), and wherein the at least one receiving space (5; 26; 26*a*; 26*b*) creates one of the at least one additional sealing arrangement along with the pressed elastic material (11*a*, 28*a*; and
wherein in the ring-shaped axial projection (22) of the housing lower part (20) surrounding the sealing bead (28), a receiving space (26) is formed by a radial circumferential groove which, when the housing upper part (16) is clamped against the housing lower part (20), receives pressed elastic material (28*a*) of the valve membrane (27) and forms the one of the at least one additional sealing arrangement,
wherein one of the at least one receiving space (26*a*) is formed by a radial circumferential groove in a radially outer, ring-shaped, axial projection (14*e*) of the disc (14*d*) supporting the valve membrane (27) around the sealing bead (28), which circumferential groove receives pressed elastic material (28*a*) of the valve membrane (27) when the housing upper part (16) is clamped against the housing lower part (20) and forms the one of the at least one additional sealing arrangement.

* * * * *